US009525358B2

(12) United States Patent
Jin et al.

(10) Patent No.: US 9,525,358 B2
(45) Date of Patent: Dec. 20, 2016

(54) RESONANT CONVERTER, CONTROL CIRCUIT AND ASSOCIATED CONTROL METHOD WITH ADAPTIVE DEAD-TIME ADJUSTMENT

(71) Applicant: Chengdu Monolithic Power Systems Co., Ltd., Chengdu (CN)

(72) Inventors: Yiqing Jin, Hangzhou (CN); Yuedong Chen, Chengdu (CN); Sicong Lin, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 0 days.

(21) Appl. No.: 14/857,405

(22) Filed: Sep. 17, 2015

(65) Prior Publication Data

US 2016/0087543 A1   Mar. 24, 2016

(30) Foreign Application Priority Data

Sep. 19, 2014 (CN) .......................... 2014 1 0483043
Oct. 22, 2014 (CN) .......................... 2014 1 0571357

(51) Int. Cl.
  *H02M 3/335* (2006.01)
  *H02M 3/337* (2006.01)
  *H02M 1/38* (2007.01)
  *H02M 1/00* (2006.01)

(52) U.S. Cl.
  CPC ............ *H02M 3/337* (2013.01); *H02M 1/38* (2013.01); *H02M 3/335* (2013.01); *H02M 2001/0058* (2013.01)

(58) Field of Classification Search
  CPC ...... H02M 1/38; H02M 3/335; H02M 3/3353; H02M 3/337; H02M 2001/0054; H02M 2001/0058
  See application file for complete search history.

(56) References Cited

U.S. PATENT DOCUMENTS

| | | | |
|---|---|---|---|
| 7,212,415 B2 * | 5/2007 | Osaka | H02M 3/33569 363/21.02 |
| 8,737,092 B2 * | 5/2014 | Adragna | H02M 3/3372 363/21.02 |
| 2013/0077364 A1 | 3/2013 | Urienza et al. | |
| 2014/0285163 A1 | 9/2014 | Lin et al. | |
| 2015/0229201 A1 * | 8/2015 | Lee | H02M 1/12 363/21.02 |
| 2016/0087544 A1 * | 3/2016 | Jin | H02M 1/32 363/21.02 |

* cited by examiner

*Primary Examiner* — Matthew Nguyen

(57) ABSTRACT

A resonant converter has a switching circuit having a first switch and a second switch, a control circuit and a resonant circuit. The control circuit has a slope sensing circuit providing a slope sense signal based on a voltage variation at the common node of the first switch and the second switch, a slope judge circuit providing a slope judge signal, and a turn-ON control circuit providing a first reset signal to adjust a first dead-time period from turning OFF the first switch to turning ON the second switch based on the slope judge signal, the slope signal, and a current flowing through the resonant tank, and providing a second reset signal to adjust a second dead-time period from turning OFF the second switch to turning ON the first switch based on the slope judge signal, the slope signal, and the current flowing through the resonant tank.

20 Claims, 9 Drawing Sheets

RESONANT CONVERTER, CONTROL CIRCUIT AND ASSOCIATED CONTROL METHOD WITH ADAPTIVE DEAD-TIME ADJUSTMENT

CROSS-REFERENCE TO RELATED APPLICATION(S)

This application claims the benefit of CN application No. 201410483043.X, filed on Sep. 19, 2014, and CN application No. 201410571357.5, filed on Oct. 22, 2014, and incorporated them herein by reference.

TECHNICAL FIELD

The present invention relates to electrical circuit, more particularly but not exclusively relates to resonant converter.

BACKGROUND

In resonant converter, a current flowing through power switches is sinusoidal wave per a resonant tank is employed. As a result, zero-voltage switching (ZVS) or zero-current switching (ZCS) is easy to be achieved.

Take a half-bridge LLC resonant converter as an example, a traditional method to achieve ZVS and ZCS is to design an appropriate switching frequency and associated dead-time period, so that when switched ON, there is no voltage across power switches, typically MOSFETs, and a current flowing through the power switches is negative. However, the half-bridge LLC resonant converter may work at a capacitive mode which is dangerous if the dead-time period is designed too long, and ZVS may be lost with a load current decreasing if the dead-time period is designed too short.

SUMMARY

It is one of the objects of the present invention to provide resonant converter, control circuit and associated control method.

One embodiment of the present invention discloses a control circuit for a resonant converter, the resonant converter having a first switch, a second switch and a resonant tank, the control circuit comprising: a slope sensing circuit, configured to provide a slope signal based on a voltage variation at a common node of the first switch and the second switch; a capacitive mode judge circuit, configured to provide a mode signal based on a current flowing through the resonant tank to indicate a working mode of the resonant converter, wherein the working mode of the resonant converter comprises a capacitive mode and an inductive mode; a slope judge circuit, configured to provide a slope judge signal based on the slope signal to indicate if the slope signal is effective to indicate the voltage variation at the common node of the first switch and the second switch, wherein if the slope signal is detected less than a first slope threshold within a predetermined time period after turning OFF the first switch, the slope signal is judged effective, and if the slope signal is detected larger than a second slope threshold within the predetermined time period after turning OFF the second switch, the slope signal is judged effective; an oscillator, configured to provide a clock signal, wherein the second switch is turned OFF when the clock signal is at a first status, and wherein the first switch is turned OFF when the clock signal is at a second status; and a turn-ON control circuit, configured to adjust a first dead-time period and a second dead-time period based on the mode signal, the slope judge signal, the slope signal, and the current flowing through the resonant tank, wherein the first dead-time period is a time period from turning OFF the first switch to turning ON the second switch, and the second dead-time period is a time period from turning OFF the second switch to turning ON the first switch, and wherein when the slope signal is judged effective, the first dead-time period is adjusted to turn ON the second switch based on comparing the slope signal with a third slope threshold, and the second dead-time period is adjusted to turn ON the first switch based on comparing the slope signal with a fourth slope threshold.

Another embodiment of the present invention discloses a resonant converter, comprising: a high-side switch, having a first terminal, a second terminal and a control terminal, wherein the first terminal is configured to receive an input voltage; a low-side switch, having a first terminal, a second terminal and a control terminal, wherein the first terminal is coupled to the second terminal of the high-side switch at a common node, and the second terminal is coupled to a system ground; a resonant tank, coupled between the common node and the system ground; a current sensing circuit, configured to provide a current sense signal based on a current flowing through the resonant tank; a slope sensing circuit, configured to provide a slope signal based on a voltage variation at the common node; a slope judge circuit, configured to provide a slope judge signal based on the slope signal, wherein the slope judge signal is configured to indicate if the slope signal is effective to indicate the voltage variation at the common node, and wherein if the slope signal is detected decreasing after turning OFF the high-side switch or if the slope signal is detected increasing after turning OFF the low-side switch, then the slope signal is judged effective; an oscillator, configured to provide a clock signal, wherein the low-side switch is turned OFF when the clock signal is at a first status, and the high-side switch is turned OFF when the clock signal is at a second status; a turn-ON control circuit, configured to provide a first reset signal and a second reset signal based on the slope signal, the slope judge signal, and the current sense signal; and a switching control circuit, configured to provide a first switching control signal to the control terminal of the high-side switch, and provide a second switching control signal to the control terminal of the low-side switch, wherein the first switching control signal is configured to turn ON the high-side switch based on the second reset signal, and is configured to turn OFF the high-side switch based on the clock signal, and wherein the second switching control signal is configured to turn ON the low-side switch based on the first reset signal, and is configured to turn OFF the low-side switch based on the clock signal.

Yet another embodiment of the present invention discloses a control method for a resonant converter, the resonant converter comprising a switching circuit having a first switch, a second switch, and a resonant tank coupled to a common node of the first switch and the second switch, wherein the first switch and the second switch are coupled in series between an input voltage and a system ground, the control method comprising: providing a slope signal based on a voltage variation at the common node of the first switch and the second switch; providing a current sense signal based on a current flowing through the resonant tank; turning OFF the second switch when a clock signal is at a first status, and turning OFF the first switch when the clock signal is at a second status; and judging if the slope signal is effective to indicate the voltage variation at the common node of the first switch and the second switch; and wherein when the slope signal is judged effective, adjusting a first dead-time period and turning ON the second switch based on the slope signal and a first slope threshold, and adjusting a second dead-time period and turning ON the first switch based on the slope signal and a second slope threshold, wherein the first dead-time period is a time period from turning OFF the first switch to turning ON the second switch, and the second dead-time period is a time period from turning OFF the second switch to turning ON the first switch.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Figure 1:
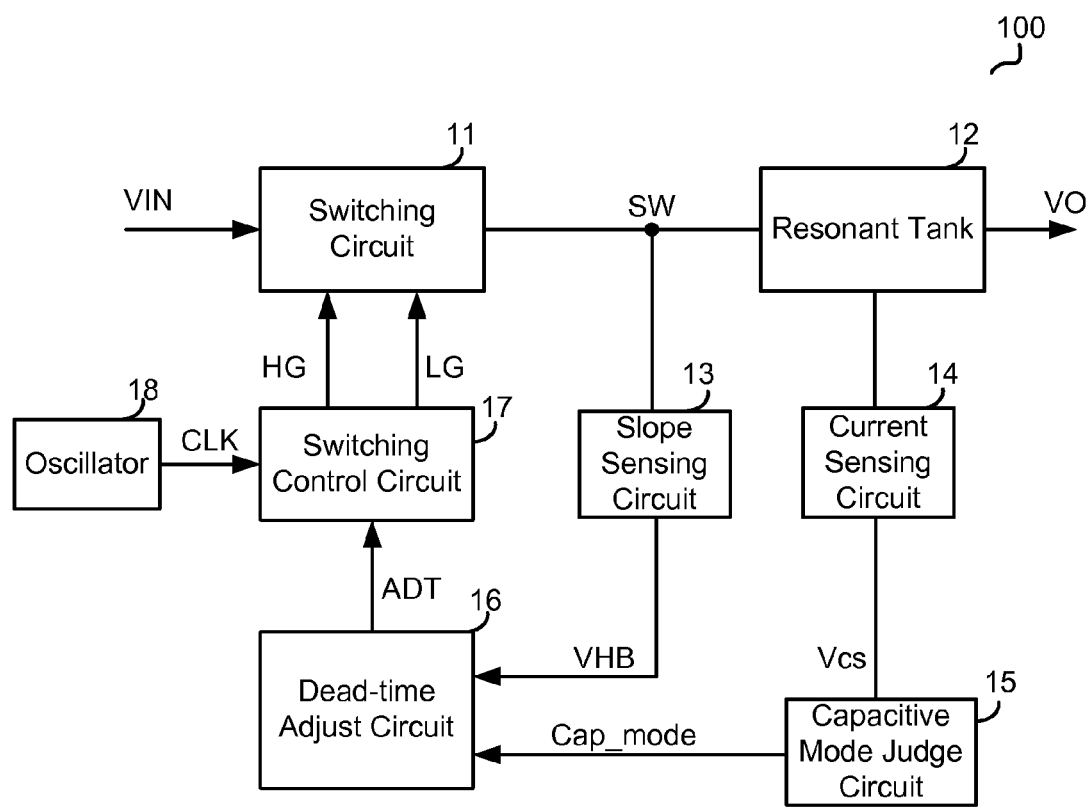
FIG. 1 illustrates a circuit block diagram of a resonant converter 100 according to an embodiment of the present invention.

FIG. 1 illustrates a circuit block diagram of a resonant converter 100 according to an embodiment of the present invention. Resonant converter 100 comprises a switching circuit 11, a resonant tank 12, a slope sensing circuit 13, a current sensing circuit 14, a capacitive mode judge circuit 15, a dead-time adjust circuit 16, a switching control circuit 17 and an oscillator 18. Switching circuit 11 is configured to receive an input voltage VIN and provide an output voltage VO through resonant tank 12. Switching circuit 11 is coupled to resonant tank 12 at a node SW, wherein switching circuit 11 comprises at least two switches, node SW is a common node of the at least two switches.

Slope sensing circuit 13 is coupled to node SW and is configured to provide a slope signal VHB based on a voltage variation at node SW. Current sensing circuit 14 is configured to provide current sense signal Vcs based on a current flowing through resonant tank 12. Oscillator 18 is configured to provide a clock signal CLK. Capacitive mode judge circuit 15 is configured to provide a mode signal Cap_mode based on current sense signal Vcs. Capacitive mode judge circuit 15 is configured to judge polarity of the current flowing through resonant tank 12 based on current sense signal Vcs, and is further configured to judge whether switching circuit 11 works at a capacitive mode or an inductive mode and then provide mode signal Cap_mode accordingly. In one embodiment, when switching circuit 11 is judged working at the capacitive mode, mode signal Cap_mode is configured to control resonant converter 100 to work at a capacitive protection mode. Dead-time adjust circuit 16 is configured to receive slope signal VHB and mode signal Cap_mode, and is configured to provide a dead-time control signal ADT to adaptively adjust a dead-time period between the at least two switches in switching circuit 11, as a result, the at least two switches in switching circuit 11 are easy to achieve ZVS within all load range. In one embodiment, term "dead-time period" refers to a time period from turning OFF one of the at least two switches to turning ON the other one of the at least two switches. Switching control circuit 17 is configured to provide a control signal HG and a control signal LG to switching circuit 11 based on clock signal CLK and dead-time control signal ADT. In one embodiment, switching control circuit 17 is configured to turn OFF the at least two switches respectively based on clock signal CLK, and turn ON the at least two switches respectively based on dead-time control signal ADT.

In the embodiment shown in FIG. 1, resonant converter 100 can adaptively adjust the dead-time period between the at least two switches in switching circuit 11 based on the voltage variation at node SW and the current flowing through resonant tank 12, as a result, resonant converter 100 is easy to achieve ZVS within all load range.

Figure 2:
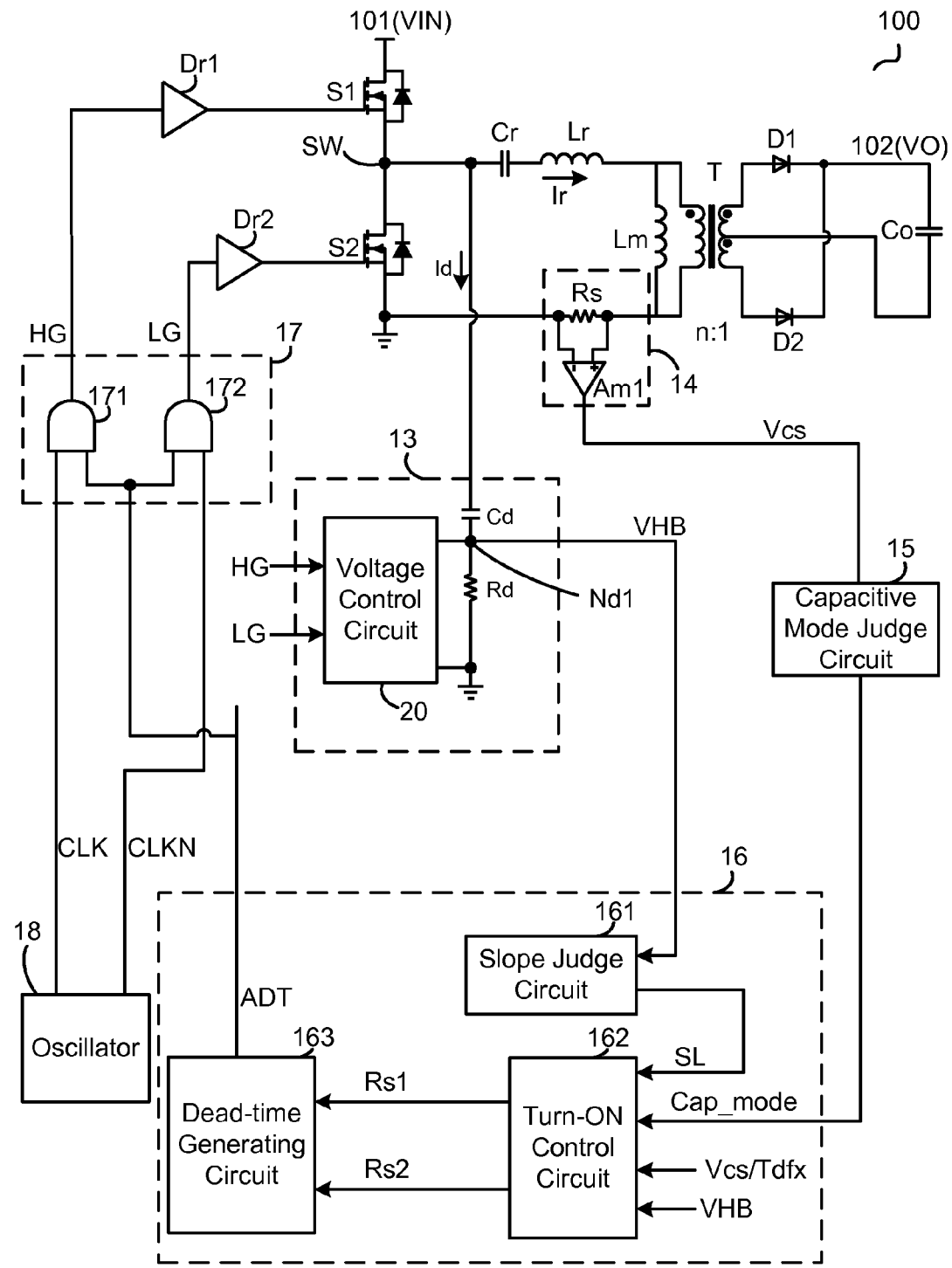
FIG. 2 schematically illustrates resonant converter 100 according to an embodiment of the present invention.

FIG. 2 schematically illustrates resonant converter 100 according to an embodiment of the present invention. Resonant converter 100 comprises a switching circuit, a resonant tank, and an output circuit, wherein the switching circuit comprises a high-side switch S1 and a low-side switch S2, the resonant tank comprises a capacitor Cr, a resonant inductor Lr and a magnetizing inductor Lm, and the output circuit comprises a transformer T, a rectified diode D1, a rectified diode D2 and an output capacitor Co, and wherein the resonant tank is coupled to the switching circuit at node SW. In one embodiment, a primary winding of transformer T comprises magnetizing inductor Lm. Resonant inductor Lr may be a discrete inductor. High-side switch S1 and low-side switch S2 may be any suitable type of controllable semiconductor device, e.g., Metal Oxide Semiconductor Field Effect Transistor (MOSFET), Insulated Gate Bipolar Transistor (IGBT). Embodiment shown in FIG. 2 employs half-bridge LLC topology, however, one of ordinary skill in the art should also appreciate that resonant converter 100 may employ any other suitable topologies, e.g., full-bridge LLC converter, asymmetric half-bridge resonant converter.

Figure 6:
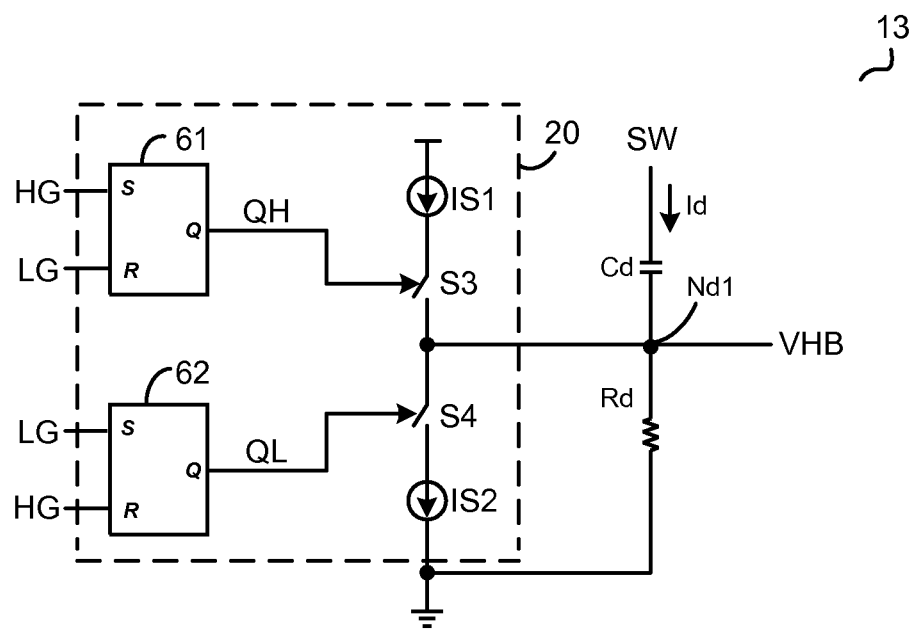
FIG. 6 schematically illustrates a slope sensing circuit 13 of resonant converter 100 as shown in FIG. 2 according to an embodiment of the present invention.

Slope sensing circuit 13 is coupled to the switching circuit at node SW, and is configured to provide slope signal VHB based on the voltage variation at node SW. As shown in FIG. 2, slope sensing circuit 13 comprises a capacitor Cd, a resistor Rd and a voltage control circuit 20. Voltage control circuit 20 is configured to receive control signal HG and control signal LG, and voltage control circuit 20 is coupled in parallel with resistor Rd to ensure slope signal VHB remaining unchanged during high-side switch S1 or low-side switch S2 is turned ON. One terminal of capacitor Cd is coupled to node SW, the other terminal of capacitor Cd is coupled to resistor Rd at a node Nd1 to provide slope signal VHB. A current Id flowing through capacitor Cd varies with a voltage at node SW, e.g., when the voltage at node SW decreases, current Id is negative to discharge capacitor Cd, slope signal VHB decreases to minimum under control of current Id and voltage control circuit 20, and until the voltage at node SW remaining constant, current Id is zero, slope signal VHB increases under control of voltage control circuit 20 until low-side switch S2 is turned ON; and when the voltage at node SW increases, current Id is positive to charge capacitor Cd, slope signal VHB increases to maximum under control of current Id and voltage control circuit 20, and until the voltage at node SW remaining constant, current Id is zero, slope signal VHB decreases under control of voltage control circuit 20 until high-side switch S1 is turned ON. When high-side switch S1 is turned ON, slope signal VHB maintains maximum under control of voltage control circuit 20, and when low-side switch S2 is turned ON, slope signal VHB maintains minimum under control of voltage control circuit 20. FIG. 6 shows a detailed circuit of slope sensing circuit 13.

Current sensing circuit 14 is configured to provide current sense signal Vcs based on a current Ir flowing through the resonant tank. In the embodiment shown in FIG. 2, current sensing circuit 14 comprises a resistor Rs and a differential amplifier Am1.

Dead-time adjust circuit 16 comprises a slope judge circuit 161, a turn-ON control circuit 162 and a dead-time generating circuit 163. Slope judge circuit 161 is configured to judge if slope signal VHB is effective, i.e., slope signal VHB is normal and can indicate the voltage variation at node SW, and provide slope judge signal SL based on slope signal VHB. In one embodiment, after turning OFF high-side switch S1, slope judge circuit 161 judges that slope signal VHB is effective when decrease of slope signal VHB is detected within a predetermined time period; otherwise slope signal VHB is judged ineffective, i.e., abnormal and slope signal VHB cannot indicate the voltage variation at node SW. In one embodiment, after turning OFF low-side switch S2, slope judge circuit 161 judges that slope signal VHB is effective when increase of slope signal VHB is detected within the predetermined time period; otherwise slope signal VHB is judged ineffective.

Turn-ON control circuit 162 is configured to receive slope judge signal SL, mode signal Cap_mode, slope signal VHB, and current sense signal Vcs or fixed delay signal Tdfx, and is configured to provide a reset signal Rs1 and a reset signal Rs2. Low-side switch S2 is turned ON based on reset signal Rs1, i.e., a first dead-time period DT1 from turning OFF high-side switch S1 to turning ON low-side switch S2 is adjusted based on reset signal Rs1. High-side switch S1 is turned ON based on reset signal Rs2, i.e., a second dead-time period DT2 from turning OFF low-side switch S2 to turning ON high-side switch S1 is adjusted based on reset signal Rs2. In one embodiment, when mode signal Cap_mode indicates that the switching circuit works at the capacitive mode, turn-ON control circuit 162 is configured to adjust the first dead-time period DT1 and the second dead-time period DT2 based on slope signal VHB, current sense signal Vcs and a time-out signal Tmout, e.g., turn-ON control circuit 162 provides reset signal Rs1 to turn ON low-side switch S2 based on slope signal VHB, current sense signal Vcs and time-out signal Tmout, and provides reset signal Rs2 to turn ON high-side switch S1 based on slope signal VHB, current sense signal Vcs and time-out signal Tmout. Time-out signal Tmout is employed to control a maximum value of the first dead-time period DT1 and a maximum value of the second dead-time period DT2 when the switching circuit works at the capacitive mode. Time-out signal Tmout represents a time out period, e.g., 10 ms, when the first dead-time period DT1 equals to the time out period, low-side switch S2 is turned ON by turn-ON control circuit 162, and when the second dead-time period DT2 equals to the time out period, high-side switch S1 is turned ON by turn-ON control circuit 162. When slope signal VHB is judge effective to indicate the voltage variation at node SW, turn-ON control circuit 162 is configured to adjust the first dead-time period DT1 and the second dead-time period DT2 based on slope signal VHB, and when slope signal VHB is judged ineffective and cannot indicate the voltage variation at node SW, turn-ON control circuit 162 is configured to adjust the first dead-time period DT1 and the second dead-time period DT2 based on current sense signal Vcs or fixed delay signal Tdfx. In one embodiment, fixed delay signal Tdfx represents a predetermined fixed dead-time period, e.g., 0.5 us, low-side switch S2 is turned ON when the first dead-time period DT1 equals the predetermined fixed dead-time period, and high-side switch S1 is turned ON when the second dead-time period DT2 equals the predetermined fixed dead-time period. In one embodiment, when mode signal Cap_mode indicates that the switching circuit works at the inductive mode, turn-ON control circuit 162 is configured to adjust the first dead-time period DT1 and the second dead-time period DT2 based on slope signal VHB, current sense signal Vcs and a maximum dead-time signal Tdmax. maximum dead-time signal Tdmax is employed to control the maximum value of the first dead-time period DT1 and the maximum value of the second dead-time period DT2 when the switching circuit works at the inductive mode. Maximum dead-time signal Tdmax represents a maximum dead time-period, e.g., 2 us. When the first dead-time period DT1 equals the maximum dead-time period, turn-ON control circuit 162 is configured to turn ON low-side switch S2, and when the second dead-time period DT2 equals the maximum dead-time period, turn-ON control circuit 162 is configured to turn ON high-side switch S1.

Dead-time generating circuit 163 is configured to receive reset signal Rs1 and reset signal Rs2, and is configured to provide dead-time control signal ADT. In one embodiment, when high-side switch S1 is turned OFF, dead-time control signal ADT becomes low voltage level, a timing circuit starts timing, dead-time control signal ADT becomes high voltage level to turn ON low-side switch S2 according to status of reset signal Rs1. In one embodiment, when low-side switch S2 is turned OFF, dead-time control signal ADT becomes low voltage level, the timing circuit starts timing, dead-time control signal ADT becomes high voltage level to turn ON high-side switch S1 according to status of reset signal Rs2. The timing circuit may be employed to provide time-out signal Tmout, fixed delay signal Tdfx and maximum dead-time signal Tdmax.

In the embodiment shown in FIG. 2, when slope sensing circuit 13 is abnormal, and cannot provide effective slope signal VHB, for example, when capacitor Cd malfunction, dead-time adjust circuit 16 is able to adjust the first dead-time period DT1 and the second dead-time period DT2 based on fixed delay signal Tdfx or current sense signal Vcs to achieve ZVS. As a result, ZVS will not be lost when slope signal VHB is ineffective.

Figure 4:
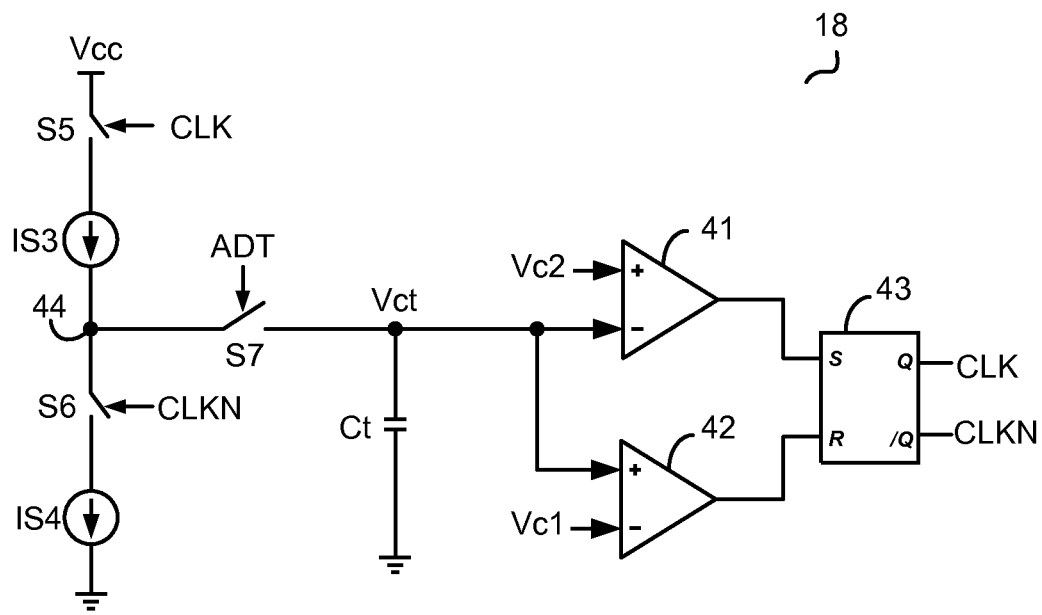
FIG. 4 schematically illustrates an oscillator 18 of resonant converter 100 as shown in FIG. 2 according to an embodiment of the present invention.

Oscillator 18 provides clock signal CLK and clock signal CLKN which having opposite phase with each other. FIG. 4 shows a detailed circuit of oscillator 18. Switching control circuit 17 provides control signal HG to high-side switch S1 based on clock signal CLK and dead-time control signal ADT, and provides control signal LG to low-side switch S2 based on clock signal CLKN and dead-time control signal ADT. In one embodiment, dead-time control signal ADT becomes low voltage level at clock signal CLK's falling edge, control signal HG becomes low voltage level to turn OFF high-side switch S1, and control signal LG becomes high voltage level to turn ON low-side switch S2 when dead-time control signal ADT becomes high voltage level again. In one embodiment, dead-time control signal ADT becomes low voltage level at clock signal CLK's rising edge, control signal LG becomes low voltage to turn OFF low-side switch S2, and control signal HG becomes high voltage level to turn ON high-side switch S1 when dead-time control signal ADT becomes high voltage level again. As shown in FIG. 2, switching control circuit 17 comprises an AND gate 171 and an AND gate 172. AND gate 171 is configured to provide control signal HG based on clock signal CLK and dead-time control signal ADT. AND gate 172 is configured to provide control signal LG based on clock signal CLKN and dead-time control signal ADT. Control signal HG is coupled to a control terminal of high-side switch S1 through a driving circuit Dr1, and control signal LG is coupled to a control terminal of low-side switch S2 through a driving circuit Dr2.

Figure 3:
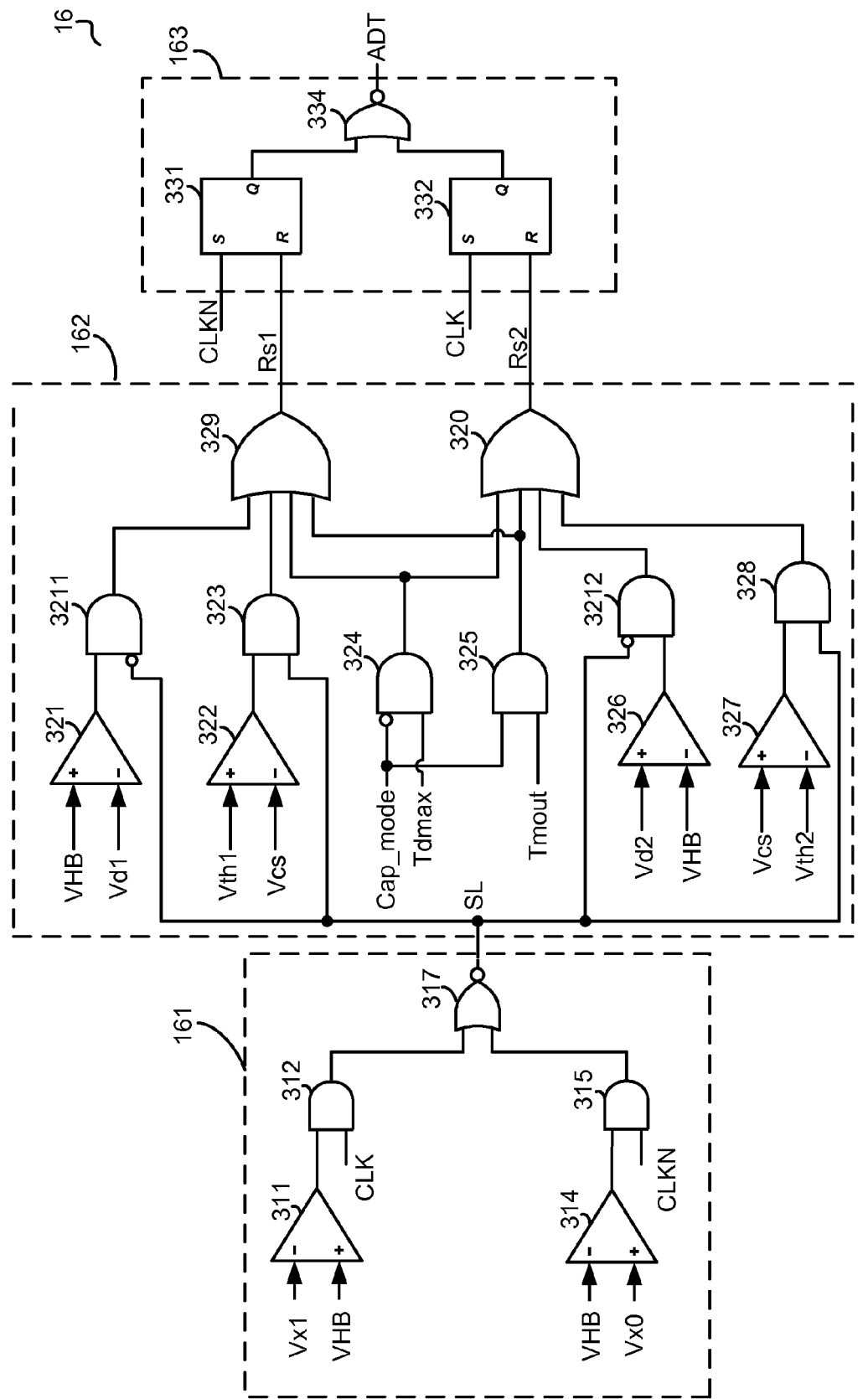
FIG. 3 schematically illustrates a dead-time adjust circuit 16 of resonant converter 100 as shown in FIG. 2 according to an embodiment of the present invention.

FIG. 3 schematically illustrates a dead-time adjust circuit 16 of resonant converter 100 as shown in FIG. 2 according to an embodiment of the present invention. After high-side switch S1 is turned OFF, slope judge circuit 161 judges if slope signal VHB is effective to indicate the voltage variation at node SW by comparing slope signal VHB with a slope threshold Vx0, and after low-side switch S2 is turned OFF, slope judge circuit 161 judges if slope signal VHB is effective to indicate the voltage variation at node SW by comparing slope signal VHB with a slope threshold Vx1. In one embodiment, within the predetermined time period after high-side switch S1 is turned OFF, when slope signal VHB is detected less than slope threshold Vx0, then slope signal VHB is judged effective; otherwise slope signal VHB is judged ineffective. And within the predetermined time period after low-side switch S2 is turned OFF, when slope signal VHB is detected larger than slope threshold Vx1, slope signal VHB is judged effective; otherwise slope signal VHB is judged ineffective. As shown in FIG. 3, slope judge circuit 161 comprises a comparator 311, an AND gate 312, a comparator 314, an AND gate 315, and a NOR gate 317. Comparator 311 comprises a non-inverting terminal configured to receive slope signal VHB, an inverting terminal configured to receive slope threshold signal Vx1, and an output terminal coupled to a first input terminal of AND gate 312. A second input terminal of AND gate 312 is configured to receive clock signal CLK. Comparator 314 comprises a non-inverting terminal configured to receive slope threshold Vx0, an inverting terminal configured to receive slope signal VHB, and an output terminal coupled to a first input terminal of AND gate 315. A second input terminal of AND gate 315 is configured to receive clock signal CLKN. NOR gate 317 comprises a first input terminal coupled to an output terminal of AND gate 312, a second input terminal coupled to an output terminal of AND gate 315, and an output terminal configured to provide slope judge signal SL. When slope signal VHB is larger than slope threshold Vx1, and clock signal CLK is high voltage level meanwhile, then slope signal VHB is judged effective, slope judge signal SL is low voltage level. When slope signal VHB is less than slope threshold Vx0, and clock signal CLKN is high voltage level meanwhile, then slope signal VHB is judged effective, slope judge signal SL is low voltage level.

If slope signal VHB is judged effective, turn-ON control circuit 162 provides reset signal Rs1 by comparing slope signal VHB with a slope threshold Vd1, and provides reset signal Rs2 by comparing slope signal VHB with a slope threshold Vd2. For example, after high-side switch S1 is turned OFF, if slope signal VHB is judged effective, then low-side switch S2 is turned ON by reset signal Rs1 when slope signal VHB is larger than slope threshold Vd1; and after low-side switch S2 is turned OFF, if slope signal VHB is judged effective, then high-side switch S1 is turned ON by reset signal Rs2 when slope signal VHB is less than slope threshold Vd2. If slope signal VHB is judged ineffective, turn-on control circuit 162 provides reset signal Rs1 by comparing current sense signal Vcs with a current threshold Vth1, and provides reset signal Rs2 by comparing current sense signal Vcs with a current threshold Vth2. For example, after high-side switch S1 is turned OFF, if slope signal VHB is judged ineffective, then low-side switch S2 is turned ON by reset signal Rs1 when current sense signal Vcs decreases less than current threshold Vth1; and after low-side switch S2 is turned OFF, if slope signal VHB is judged ineffective, then high-side switch S1 is turned ON by reset signal Rs2 when current sense signal Vcs increases larger than current threshold Vth2. In another embodiment, if slope signal VHB is judged ineffective, turn-ON control circuit 162 provides reset signal Rs1 and reset signal Rs2 based on fixed delay signal Tdfx. In the embodiment shown in FIG. 3, turn-ON control circuit 162 comprises a comparator 321, a comparator 322, a comparator 326, a comparator 327, an AND gate 323, an AND gate 328, an OR gate 329, an OR gate 320, a logic circuit 3211, and a logic circuit 3212. Comparator 321 comprises a non-inverting terminal configured to receive slope signal VHB, an inverting terminal configured to receive slope threshold Vd1, and an output terminal couple to a first input terminal of OR gate 329 through logic circuit 3211. If slope signal VHB is judged effective, slope judge signal SL is low voltage level, and when slope signal VHB is larger than slope threshold Vd1, reset signal Rs1 is high voltage level to turn ON low-side switch S2. Comparator 322 comprises a non-inverting terminal configured to receive current threshold Vth1, an inverting terminal configured to receive current sense signal Vcs, and an output terminal coupled to a second input terminal of OR gate 329 through AND gate 323. If slope signal VHB is judged ineffective, slope judge signal SL is high voltage level, and when current sense signal Vcs decreases less than current threshold Vth1, reset signal Rs1 is high voltage level to turn ON low-side switch S2. Comparator 326 comprises a non-inverting terminal configured to receive slope threshold Vd2, an inverting terminal configured to receive slope signal VHB, and an output terminal coupled to a first input terminal of OR gate 320 through logic circuit 3212. If slope signal VHB is judged effective, slope judge signal SL is low voltage level, and when slope signal VHB is less than slope threshold Vd2, reset signal Rs2 is high voltage level to turn ON high-side switch S1. Comparator 327 comprises a non-inverting terminal configured to receive current sense signal Vcs, an inverting terminal configured to receive current threshold Vth2, and an output terminal coupled to a second input terminal of OR gate 320 through AND gate 328. If slope signal VHB is judged ineffective, slope judge signal SL is high voltage level, and when current sense signal Vcs increases larger than current threshold Vth2, reset signal Rs2 is high voltage level to turn ON high-side switch S1. As shown in FIG. 3, turn-ON control circuit 162 further comprises a logic circuit 324 and a logic circuit 325. A first input terminal of logic circuit 324 receives mode signal Cap_mode, a second input terminal of logic circuit 324 receives maximum dead-time signal Tdmax, and an output terminal of logic circuit 324 is coupled to a third input terminal of OR gate 329 and a third input terminal of OR gate 320. A first input terminal of logic circuit 325 receives mode signal Cap_mode, a second input terminal of logic circuit 325 receives time-out signal Tmout, and an output terminal of logic circuit 325 is coupled to a fourth input terminal of OR gate 329 and a fourth input terminal of OR gate 320. When mode signal Cap_mode indicates that the switching circuit works at the capacitive mode, a voltage at the output terminal of logic circuit 324 is low, and logic circuit 325 transfers time-out signal Tmout to OR gate 329 and OR gate 320 to control a maximum value of the first dead-time period DT1 and the second dead-time period DT2. When mode signal Cap_mode indicates that the switching circuit works at an inductive mode, a voltage at the output terminal of logic circuit 325 is low, and logic circuit 324 transfers maximum dead-time signal Tdmax to OR gate 329 and OR gate 320 to control the maximum value of the first dead-time period DT1 and the second dead-time period DT2.

Dead-time generating circuit 163 provides dead-time control signal ADT to turn ON low-side switch based on reset signal Rs1 and turn ON high-side switch based on reset signal Rs2. As shown in FIG. 3, dead-time generating circuit 163 comprises a RS flip-flop 331, a RS flip-flop 332 and a NOR gate 334. RS flip-flop 331 comprises a set terminal S configured to receive clock signal CLKN, a reset terminal R coupled to an output terminal of OR gate 329 to receive reset signal Rs1, and an output terminal Q coupled to a first input terminal of NOR gate 334. RS flip-flop 332 comprises a set terminal S configured to receive clock signal CLK, a reset terminal R coupled to an output terminal of OR gate 320 to receive reset signal Rs2, and an output terminal Q coupled to a second input terminal of NOR gate 334. An output terminal of NOR gate 334 is configured to provide dead-time control signal ADT. When clock signal CLKN becomes high voltage level, high-side switch S1 is turned OFF, RS flip-flop 331 is set to provide low voltage level dead-time control signal ADT, and when reset signal Rs1 is high voltage level, RS flip-flop 331 is reset to provide high voltage level dead-time control signal ADT to turn ON low-side switch S2. When clock signal CLK becomes high voltage level, low-side switch S2 is turned OFF, RS flip-flop 332 is set to provide low voltage level dead-time control signal ADT, and when reset signal Rs2 is high voltage level, RS flip-flop 332 is reset to provide high voltage level dead-time control signal ADT to turn ON high-side switch S1.

FIG. 4 schematically illustrates an oscillator 18 of resonant converter 100 as shown in FIG. 2 according to an embodiment of the present invention. In one embodiment, oscillator 18 stops oscillating during the first dead-time period DT1 and the second dead-time period DT2, as a result, a time period of control signal HG at high voltage level basically equals a time period of control signal LG at high voltage level, and an ON-time period of high-side switch S1 equals an ON-time period of low-side switch S2. As shown in FIG. 4, oscillator 18 comprises a current source IS3, a current source IS4, a switch S5, a switch S6, a switch S7, a capacitor Ct, a comparator 41, a comparator 42 and a RS flip-flop 43. Current source IS3, switch S5, current source IS4 and switch S6 are coupled in series between a voltage Vcc and a system ground. One terminal of current source IS3 is coupled to voltage Vcc through switch S5, the other terminal of current source IS3 is coupled to a node 44. One terminal of current source IS4 is coupled to node 44 through switch S6, the other terminal of current source IS4 is coupled to the system ground. Switch S7 is coupled between node 44 and one terminal of capacitor Ct, the other terminal of capacitor Ct is coupled to the system ground. Current source S3 is configured to charge capacitor Ct through switch S5 and switch S7 based on clock signal CLK and dead-time control signal ADT. Current source S4 is configured to discharge capacitor Ct through switch S6 and switch S7 based on clock signal CLKN and dead-time control signal ADT. In one embodiment, switch S7 is turned ON and turned OFF based on dead-time control signal ADT. When high-side switch S1 and low-side switch S2 are turned OFF at the same time, switch S7 is turned OFF, and a voltage Vct across capacitor Ct maintains until high-side switch S1 or low-side switch S2 is turned ON. When high-side switch S1 or low-side switch S2 is turned ON, switch S7 is turned ON, capacitor Ct is charged by current source IS3 if clock signal CLK is high voltage level, and capacitor Ct is discharged by current source IS4 if clock signal CLK is low voltage level. Comparator 41 comprises a non-inverting terminal configured to receive a comparing threshold Vc2, an inverting terminal coupled to capacitor Ct to receive voltage Vct, and an output terminal coupled to a set terminal S of RS flip-flop 43. When voltage Vct is less than comparing threshold Vc2, RS flip-flop 43 is set to provide high voltage level clock signal CLK and low voltage level clock signal CLKN. Comparator 42 comprises a non-inverting terminal coupled to capacitor Ct to receive voltage Vct, an inverting terminal configured to receive a comparing threshold Vc1, and an output terminal coupled to a reset terminal R of RS flip-flop 43. When voltage Vct is larger than comparing threshold Vc1, RS flip-flop 43 is reset to provide low voltage level clock signal CLK and high voltage level clock signal CLKN. Where comparing threshold Vc2 is less than comparing threshold Vc1, e.g., Vc2=0.9V, Vc1=3.9V.

Figure 5:
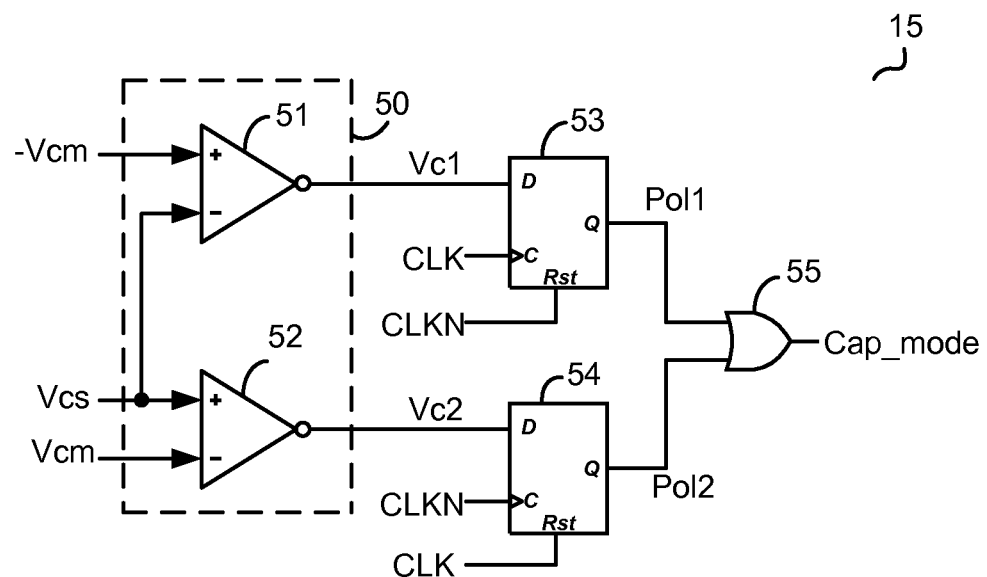
FIG. 5 schematically illustrates a capacitive mode judge circuit 15 of resonant converter 100 as shown in FIG. 2 according to an embodiment of the present invention.

FIG. 5 schematically illustrates a capacitive mode judge circuit 15 of resonant converter 100 as shown in FIG. 2 according to an embodiment of the present invention. In one embodiment, capacitive mode judge circuit 15 judges a working mode of resonant converter 100 by detecting polarity of current Ir during a time period high-side switch S1 or low-side switch S2 is turned OFF. If current Ir is negative during the time period that high-side switch S1 is turned OFF, then resonant converter 100 is judged working at the capacitive mode, otherwise if current Ir is positive during the time period that high-side switch S1 is turned OFF, then resonant converter 100 is judged working at the inductive mode. If current Ir is positive during the time period that low-side switch S2 is turned OFF, then resonant converter 100 is judged working at the capacitive mode, otherwise if current Ir is negative during the time period that low-side switch S2 is turned OFF, then resonant converter 100 is judged working at the inductive mode. As shown in FIG. 5, capacitive mode judge circuit 15 comprises a current polarity detect circuit 50, a D flip-flop 53, a D flip-flop 54 and an OR gate 55. Current polarity detect circuit 50 further comprises a comparator 51 and a comparator 52. Comparator 51 comprises a non-inverting terminal configured to receive a negative current threshold −Vcm, an inverting terminal configured to receive current sense signal Vcs, and an inverting output terminal configured to provide a comparing signal Vc1 to a data input terminal D of D flip-flop 53. A clock terminal C of D flip-flop 53 is configured to receive clock signal CLK, a reset terminal Rst of D flip-flop 53 is configured to receive clock signal CLKN, and an output terminal Q of D flip-flop 53 is configured to provide a polarity judge signal Pol1 based on comparing signal Vc1 at clock signal CLK's rising edge, D flip-flop 53 is reset to provide low voltage level polarity judge signal Pol1 at clock signal CLKN's rising edge. When current sense signal Vcs is less than negative current threshold −Vcm at clock signal CLK's rising edge, comparing signal Vc1 is low to indicate that resonant converter 100 works at the inductive mode, and polarity judge signal Pol1 is low; otherwise when current sense signal Vcs is larger than negative current threshold −Vcm at clock signal CLK's rising edge, comparing signal Vc1 is high to indicate that resonant converter 100 works at the capacitive mode, and polarity judge signal Pol1 is high, mode signal Cap_mode becomes high. Comparator 52 comprises a non-inverting terminal configured to receive current sense signal Vcs, an inverting terminal configured to receive a positive current threshold Vcm, and an inverting output terminal configured to provide a comparing signal Vc2 to a data input terminal D of D flip-flop 54. A clock terminal C of D flip-flop 54 is configured to receive clock signal CLKN, a reset terminal Rst of D flip-flop 54 is configured to receive clock signal CLK, and an output terminal Q of D flip-flop 54 is configured to provide a polarity judge signal Po12 based on comparing signal Vc2 at clock signal CLKN's rising edge, D flip-flop 54 is reset to provide low voltage level polarity judge signal Po12 at clock signal CLK's rising edge. When current sense signal Vcs is larger than positive current threshold Vcm at clock signal CLK's falling edge, comparing signal Vc2 is low to indicate that resonant converter 100 works at the inductive mode, and polarity judge signal Po12 is low; otherwise when current sense signal Vcs is less than positive current threshold Vcm at clock signal CLK's falling edge, comparing signal Vc2 is high to indicate that resonant converter 100 works at the capacitive mode, and polarity judge signal Po12 is high, mode signal Cap_mode becomes high. In one embodiment, positive current threshold Vcm is 80 mV, and negative current threshold −Vcm is −80 mV.

FIG. 6 schematically illustrates a slope sensing circuit 13 of resonant converter 100 as shown in FIG. 2 according to an embodiment of the present invention. As shown in FIG. 6, slope sensing circuit 13 comprises capacitor Cd, resistor Rd, and voltage control circuit 20. Voltage control circuit 20 comprises a current source IS1, a current source IS2, a switch S3 coupled with current source IS1 in series, and a switch S4 coupled with current source IS2 in series. Node Nd1 is charged by current source IS1 when switch S3 is turned ON and node Nd1 is discharged by current source IS2 when switch S4 is turned ON. Slope sensing circuit 13 is configured to provide slope signal VHB at node Nd1 based on current source IS1, current source IS2 and current Id flowing through capacitor Cd. When high-side switch S1 is turned ON, switch S4 is turned OFF by a control signal QL, and switch S3 is turned ON by a control signal QH. Slope signal VHB increases to and maintains high voltage level. When high-side switch S1 is turned OFF, the voltage at node SW decreases due to current Ir, current Id becomes negative. If an absolute value of current Id is larger than a current provided by current source IS1, capacitor Cd is discharged, and slope signal VHB decreases to zero. When the voltage at node SW keeps constant, current Id becomes zero and capacitor Cd is charged by current source IS1, slope signal VHB increases. When slope signal VHB increases to slope threshold Vd1, low-side switch S2 is turned ON, switch S3 is turned OFF by control signal QH, and switch S4 is turned ON by control signal QL. Slope signal VHB decreases to maintains low voltage level. When low-side switch S2 is turned OFF, the voltage at node SW increases due to current Ir, current Id is positive. If current Id is larger than a current provided by current source IS2, capacitor Cd is charged, and slope signal VHB increases. When the voltage at node SW keeps constant, current Id becomes zero and capacitor Cd is discharged by current source IS2, slope signal VHB decreases. When slope signal VHB decreases to slope threshold Vd2, high-side switch S1 is turned ON, switch S3 is turned ON and switch S4 is turned OFF. One embodiment of current Id is expressed by the following equation:

$$Id=Cd*D(VSW)/D(t),$$

where VSW is the voltage at node SW.

Slope sensing circuit 13 provides slope signal VHB to indicate the voltage variation at node SW based on current Id, the current provided by current source IS1 and the current provided by current source IS2. Voltage control circuit 20 further comprises a RS flip-flop 61 and a RS flip-flop 62. A set terminal S of RS flip-flop 61 is configured to receive control signal HG, a reset terminal R of RS flip-flop 61 is configured to receive control signal LG, and an output terminal Q of RS flip-flop 61 is configured to provide control signal QH based on control signal HG and control signal LG. A set terminal S of RS flip-flop 62 is configured to receive control signal LG, a reset terminal R of RS flip-flop 62 is configured to receive control signal HG, and an output terminal Q of RS flip-flop 62 is configured to provide control signal QL based on control signal HG and control signal LG. In one embodiment, control signal QL and control signal QH have an opposite phase.

Figure 7:
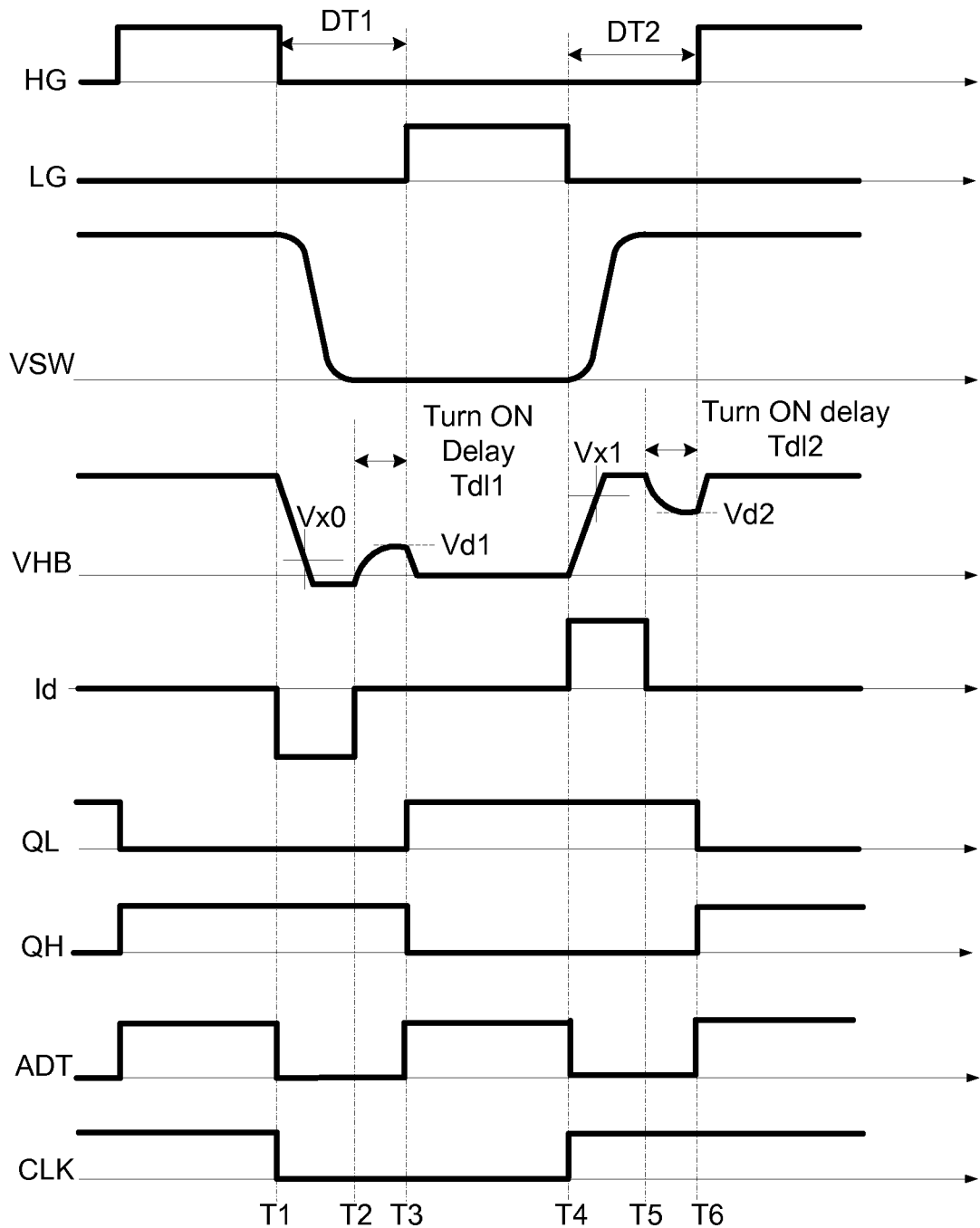
FIG. 7 shows waveforms illustrating signals of resonant converter 100 as shown in FIG. 2 when slope signal VHB is effective according to an embodiment of the present invention.

FIG. 7 shows waveforms illustrating signals of resonant converter 100 as shown in FIG. 2 when slope signal VHB is effective according to an embodiment of the present invention. If slope signal VHB is recognized effective to indicate the voltage variation at node SW, dead-time adjust circuit 16 is configured to adaptively adjust the first dead-time period DT1 and the second dead-time period DT2 based on slope signal VHB.

As shown in FIG. 7, at time T1, clock signal CLK becomes low voltage level, control signal HG becomes low voltage level to turn OFF high-side switch S1, dead-time control signal ADT becomes low voltage level, control signal QH keeps high voltage level and node Nd1 is charged by current source IS1, voltage VSW decreases, current Id becomes negative, and slope signal VHB decreases due to current Id and the current provided by current source IS1, where the absolute value of current Id is larger than the current provided by current source IS1. When slope signal VHB is less than slope threshold Vx0, slope signal VHB is judged effective to indicate the variation of voltage VSW, the first dead-time period DT1 from turning OFF high-side switch S1 to turning ON low-side switch S2 is adaptively adjusted based on slope signal VHB. At time T2, voltage VSW decreases to zero volt and then maintains zero volt, current Id becomes zero. And after a turn-ON delay time period TdI1, low-side switch S2 is turned ON at time T3. In the embodiment shown in FIG. 7, turn-ON delay time period TdI1 is determined based on slope signal VHB. In another embodiment, turn-ON delay time period TdI1 is determined by a timing circuit. In the embodiment shown in FIG. 7, at time T2, slope signal VHB starts increasing due to the current provided by current source IS1. At time T3, when slope signal VHB increases to slope threshold Vd1, dead-time control signal ADT becomes high voltage level, control signal LG becomes high voltage level to turn ON low-side switch S2, control signal QH becomes low voltage level to turn OFF switch S3, control signal QL becomes high voltage level to turn ON switch S4, then slope signal VHB maintains low due to the current provided by current source IS2. The first dead-time period DT1 is T3-T1. In one embodiment, slope threshold Vx0 is less than slope threshold Vd1.

At time T4, clock signal CLK becomes high voltage level, control signal LG becomes low voltage level to turn OFF low-side switch S2, dead-time control signal ADT becomes low voltage level, control signal QL keeps high voltage level, and node Nd1 is discharged by current source IS2, voltage VSW increases and current Id becomes positive, and slope signal VHB increases due to current Id and the current provided by current source IS2, where current Id is larger than the current provided by current source IS2. When slope signal VHB is larger than slope threshold Vx1, slope signal VHB is judged effective to indicate the variation of voltage VSW, the second dead-time period DT2 from turning OFF low switch S2 to turning ON high-side switch S1 is adaptively adjusted based on slope signal VHB. At time T5, voltage VSW maintains its maximum value, current Id becomes zero, and after a turn-ON delay time period TdI2, high-side switch S1 is turned ON at time T6. In the embodiment shown in FIG. 7, turn-ON delay time period TdI2 is determined based on slope signal VHB. In another embodiment, turn-ON delay time period TdI2 may be determined by a timing circuit. As shown in FIG. 7, at time T5, slope signal VHB starts decreasing due to the current provided by current source IS2. At time T6, when slope signal VHB is less than slope threshold Vd2, dead-time control signal ADT becomes high voltage level, control signal HG becomes high to turn ON high-side switch S1, control signal QL becomes low to turn OFF switch S4, control signal QH becomes high to turn ON switch S3, then slope signal VHB maintains high voltage level due to the current provided by current source IS1. The second dead-time period DT2 is T6-T4. In one embodiment, slope threshold Vx1 is larger than slope threshold Vd2.

Figure 8:
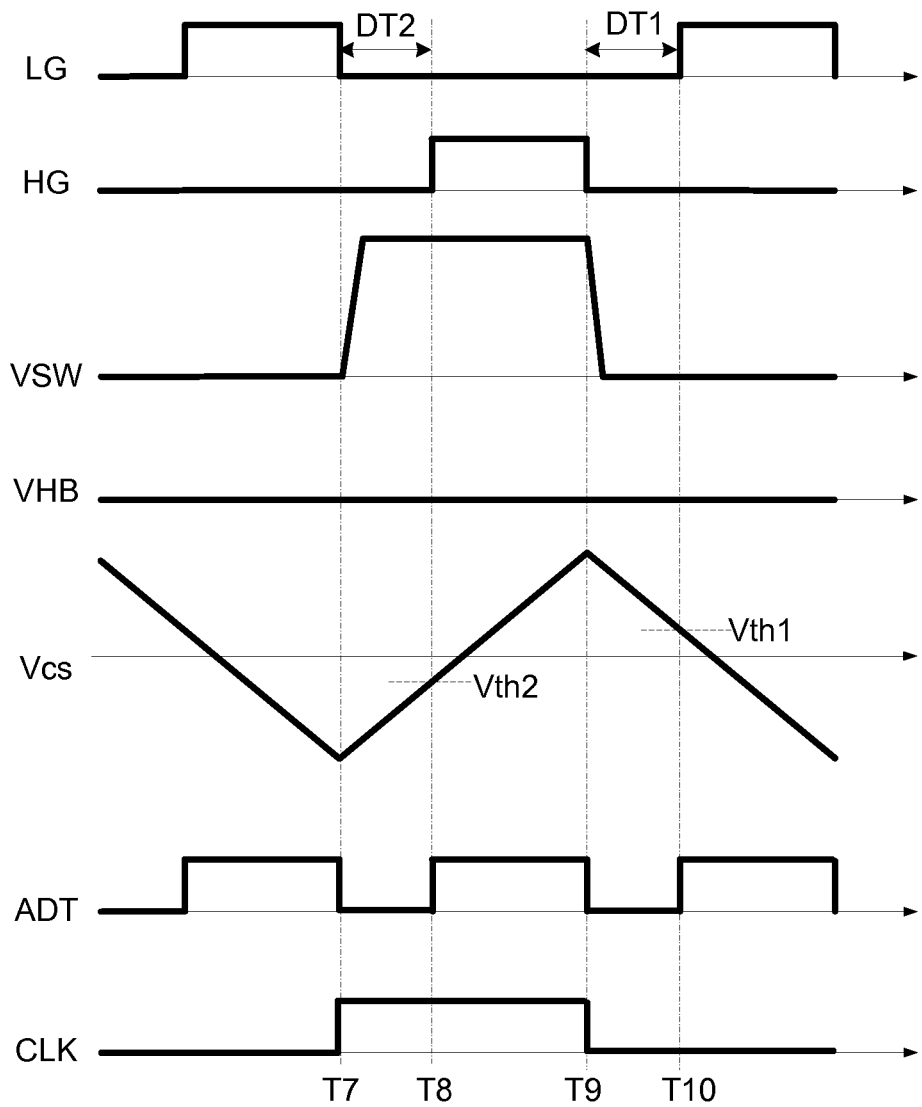
FIG. 8 shows waveforms illustrating signals of resonant converter 100 as shown in FIG. 2 when slope signal VHB is ineffective according to an embodiment of the present invention.

FIG. 8 shows waveforms illustrating signals of resonant converter 100 as shown in FIG. 2 when slope signal VHB is ineffective according to an embodiment of the present invention. In some embodiments, when capacitor Cd is malfunction, e.g., open or short circuit, slope signal VHB is ineffective and cannot indicate the variation of voltage VSW. In the embodiment shown in FIG. 8, slope signal VHB is ineffective and cannot indicate the variation of voltage VSW, and the first dead-time period DT1 and the second dead-time period DT2 is adaptively adjusted in accordance with current sense signal Vcs.

As shown in FIG. 8, at time T7, clock signal CLK becomes high voltage level, control signal LG becomes low voltage level to turn OFF low-side switch S2, dead-time control signal ADT becomes low voltage level, voltage VSW increases, and current sense signal Vcs increases. At time T8, current sense signal Vcs increases larger than current threshold Vth2, then dead-time control signal ADT becomes high voltage level, and control signal HG becomes high voltage level to turn ON high-side switch S1. The second dead-time period DT2 is T8-T7. At time T9, clock signal CLK becomes low voltage level, control signal HG becomes low voltage level to turn OFF high-side switch S1, dead-time control signal ADT becomes low voltage level, voltage VSW decreases, and current sense signal Vcs decreases. At time T10, current sense signal Vcs decreases to less than current threshold Vth1, dead-time control signal ADT becomes high voltage level, and control signal LG becomes high voltage level to turn ON low-side switch S2. The first dead-time period DT1 is T10-T9.

Figure 9:
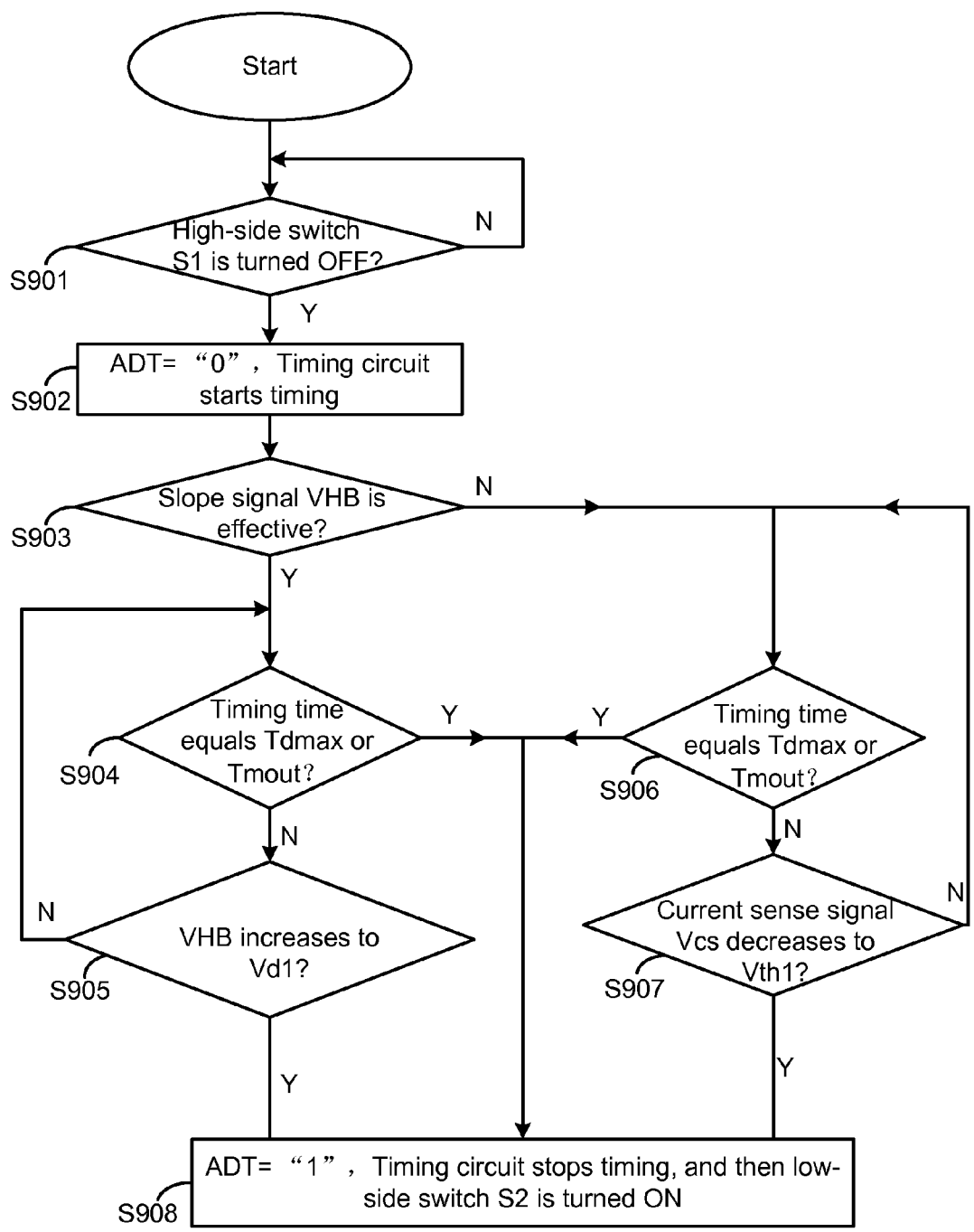
FIG. 9 shows a flow chart illustrating a control method for turning ON a low-side switch S2 of resonant converter 100 as shown in FIG. 2 according to an embodiment of the present invention.

FIG. 9 shows a flow chart illustrating a control method for turning ON a low-side switch S2 of resonant converter 100 as shown in FIG. 2 according to an embodiment of the present invention. The control method comprises steps S901-S908.

At step S901, if high-side switch S1 is turned OFF, then go to step S902.

At step S902, dead-time control signal ADT becomes low voltage level, i.e., ADT="0", and a timing circuit starts timing.

At step S903, if slope signal VHB is judged effective to indicate the voltage variation at node SW, then go to step S904, otherwise go to step S906. In one embodiment, if slope signal VHB is less than slope threshold Vx0 within a predetermined time period after clock signal becoming low voltage level, then slope signal VHB is judged effective, otherwise slope signal VHB is judged ineffective and cannot indicate the voltage variation at node SW.

At step S904, if a time period timed by the timing circuit equals maximum dead-time signal Tdmax or time-out signal Tmout, then go to step S908, otherwise go to step S905.

At step S905, if slope signal VHB increases to slope threshold Vd1, then go to step S908, otherwise go back to step S904.

At step S906, if a time period timed by the timing circuit equals maximum dead-time signal Tdmax or time-out signal Tmout, then go to step S908, otherwise go to step S907.

At step S907, if current sense signal Vcs decreases to less than current threshold Vth1, then go to step S908, otherwise go back to step S906.

At step S908, dead-time control signal ADT becomes high voltage level, i.e., ADT="1", the timing circuit stops timing, and low-side switch S2 is turned ON.

Figure 10:
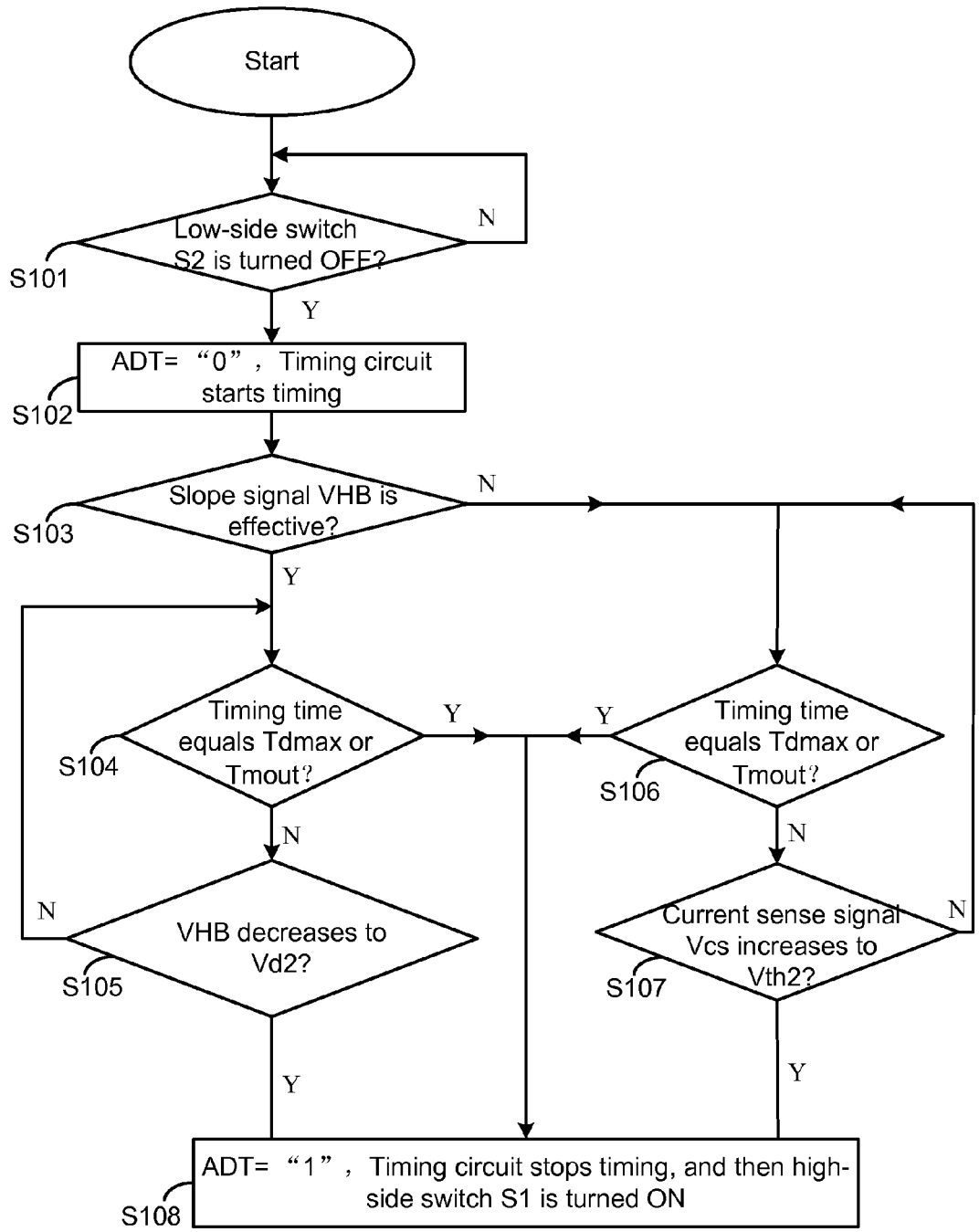
FIG. 10 shows a flow chart illustrating a control method for turning ON a high-side switch S1 of resonant converter 100 as shown in FIG. 2 according to an embodiment of the present invention.

FIG. 10 shows a flow chart illustrating a control method for turning ON a high-side switch S1 of resonant converter 100 as shown in FIG. 2 according to an embodiment of the present invention. The control method comprises steps S101-S108.

At step S101, if low-side switch S2 is turned OFF, then go to step S102.

At step S102, dead-time control signal ADT becomes low voltage level, and a timing circuit starts timing.

At step S103, if slope signal VHB is judged effective to indicate the voltage variation at node SW, then go to step S104, otherwise go to step S106. In one embodiment, if slope signal VHB is larger than slope threshold Vx1 within a predetermined time period after clock signal CLK becoming high voltage level, then slope signal VHB is judged effective, otherwise slope signal VHB is judged ineffective and cannot indicate the voltage variation at node SW.

At step S104, if a time period timed by the timing circuit equals maximum dead-time signal Tdmax or time-out signal Tmout, then go to step S108, otherwise go to step S105.

At step S105, if slope signal VHB decreases to slope threshold Vd2, then go to step S108, otherwise go back to step S104.

At step S106, if a time period timed by the timing circuit equals maximum dead-time signal Tdmax or time-out signal Tmout, then go to step S108, otherwise go to step S107.

At step S107, if current sense signal Vcs increases to larger than current threshold Vth2, then go to step S108, otherwise go back to step S106.

At step S108, dead-time control signal ADT becomes high voltage level, i.e., ADT="1", the timing circuit stops timing, and high-side switch S1 is turned ON.

Note that in the flow chart described above, the box functions may also be implemented with different order as shown in FIGS. 9-10. For example, two successive box functions may be executed meanwhile, or sometimes the box functions may be executed in reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A control circuit for a resonant converter, the resonant converter having a first switch, a second switch and a resonant tank, the control circuit comprising:
   a slope sensing circuit, configured to provide a slope signal based on a voltage variation at a common node of the first switch and the second switch;
   a capacitive mode judge circuit, configured to provide a mode signal based on a current flowing through the resonant tank to indicate a working mode of the resonant converter, wherein the working mode of the resonant converter comprises a capacitive mode and an inductive mode;
   a slope judge circuit, configured to provide a slope judge signal based on the slope signal to indicate if the slope signal is effective to indicate the voltage variation at the common node of the first switch and the second switch, wherein if the slope signal is detected less than a first slope threshold within a predetermined time period after turning OFF the first switch, the slope signal is judged effective, and if the slope signal is detected larger than a second slope threshold within the predetermined time period after turning OFF the second switch, the slope signal is judged effective;
   an oscillator, configured to provide a clock signal, wherein the second switch is turned OFF when the clock signal is at a first status, and wherein the first switch is turned OFF when the clock signal is at a second status; and
   a turn-ON control circuit, configured to adjust a first dead-time period and a second dead-time period based on the mode signal, the slope judge signal, the slope signal, and the current flowing through the resonant tank, wherein the first dead-time period is a time period from turning OFF the first switch to turning ON the second switch, and the second dead-time period is a time period from turning OFF the second switch to turning ON the first switch, and wherein when the slope signal is judged effective, the first dead-time period is adjusted to turn ON the second switch based on comparing the slope signal with a third slope threshold, and the second dead-time period is adjusted to turn ON the first switch based on comparing the slope signal with a fourth slope threshold.

2. The control circuit of claim 1, wherein when the slope signal cannot indicate the voltage variation at the common node of the first switch and the second switch, the first switch is turned ON based on comparing a current sense signal representing the current flowing through the resonant tank with a first current threshold, and the second switch is turned ON based on comparing the current sense signal with a second current threshold.

3. The control circuit of claim 1, wherein the slope sensing circuit further comprises:
   a capacitor, having a first terminal and a second terminal, wherein the first terminal is coupled to the common node of the first switch and the second switch, and the second terminal is configured to provide the slope signal;
   a resistor, having a first terminal and a second terminal, wherein the first terminal is coupled to the second terminal of the capacitor, and the second terminal is coupled to a system ground; and
   a voltage control circuit, coupled to the resistor in parallel, wherein the voltage control circuit is configured to maintain the slope signal at high voltage level when the first switch is turned ON, and the voltage control circuit is configured to maintain the slope signal at low voltage level when the second switch is turned ON.

4. The control circuit of claim 3, wherein the voltage control circuit further comprises:
   a first current source, coupled in series with a third switch between a voltage and the second terminal of the capacitor, wherein when the first switch is turned ON, the third switch is turned ON and the first current source is configured to provide a charge current to the second terminal of the capacitor, and wherein when the second switch is turned ON, the third switch is turned OFF; and
   a second current source, coupled in series with a fourth switch between the second terminal of capacitor and the system ground, wherein when the second switch is turned ON, the fourth switch is turned ON and the second current source is configured to provide a discharge current to the second terminal of the capacitor, and wherein when the first switch is turned ON, the fourth switch is turned OFF.

5. The control circuit of claim 1, wherein the slope judge circuit further comprises:
   a first comparator, having a first input terminal, a second input terminal and an output terminal, wherein the first input terminal is configured to receive the slope signal, and the second input terminal is configured to receive the first slope threshold;
   a second comparator, having a first input terminal, a second input terminal and an output terminal, wherein the first input terminal is configured to receive the slope signal, and the second input terminal is configured to receive the second slope threshold; and
   a first logic circuit, having a first input terminal, a second input terminal, a third input terminal, and an output terminal, wherein the first input terminal is coupled to the output terminal of the first comparator, the second input terminal is coupled to the output terminal of the second comparator, and the third input terminal is configured to receive the clock signal, wherein when the clock signal is at the first status, the output terminal is configured to provide the slope judge signal based on comparing the slope signal with the second slope threshold, and wherein when the clock signal is at the second status, the output terminal is configured to provide the slope judge signal based on comparing the slope signal with the first slope threshold.

6. The control circuit of claim 1, wherein the turn-ON control circuit further comprises:
a third comparator, having a first input terminal, a second input terminal and an output terminal, wherein the first input terminal is configured to receive the slope signal, and the second input terminal is configured to receive the third slope threshold;
a fourth comparator, having a first input terminal, a second input terminal and an output terminal, wherein the first input terminal is configured to receive the current sense signal, and the second input terminal is configured to receive a first current threshold;
a fifth comparator, having a first input terminal, a second input terminal and an output terminal, wherein the first input terminal is configured to receive the slope signal, and the second input terminal is configured to receive the fourth slope threshold;
a sixth comparator, having a first input terminal, a second input terminal, and an output terminal, wherein the first input terminal is configured to receive the current sense signal, and the second input terminal is configured to receive a second current threshold;
a second logic circuit, having a first input terminal, a second input terminal and an output terminal, wherein the first input terminal is configured to receive the mode signal, and the second input terminal is configured to receive a time-out signal;
a third logic circuit, having a first input terminal, a second input terminal and an output terminal, wherein the first input terminal is configured to receive the mode signal, and the second input terminal is configured to receive a maximum dead-time signal;
a fourth logic circuit, having a first input terminal, a second input terminal, a third input terminal, a fourth input terminal, a fifth input terminal, and an output terminal, wherein the first input terminal is coupled to the output terminal of the third comparator, the second input terminal is coupled to the output terminal of the fourth comparator, the third input terminal is coupled to the output terminal of the second logic circuit, the fourth input terminal is coupled to the output terminal of the third logic circuit, the fifth input terminal is configured to receive the slope judge signal, and the output terminal is configured to provide a first reset signal to turn ON the second switch; and
a fifth logic circuit, having a first input terminal, a second input terminal, a third input terminal, a fourth input terminal, a fifth input terminal, and an output terminal, wherein the first input terminal is coupled to the output terminal of the fifth comparator, the second input terminal is coupled to the output terminal of the sixth comparator, the third input terminal is coupled to the output terminal of the second logic circuit, the fourth input terminal is coupled to the output terminal of the third logic circuit, the fifth input terminal is coupled to the slope judge signal, and the output terminal is configured to provide a second reset signal to turn ON the first switch.

7. The control circuit of claim 6, wherein:
when the slope judge signal indicates that the slope signal is effective to indicate the voltage variation at the common node of the first switch and the second switch, the fourth logic circuit is configured to provide the first reset signal based on comparing the slope signal with the third slope threshold, and the fifth logic circuit is configured to provide the second reset signal based on comparing the slope signal with the fourth slope threshold; and
when the slope judge signal indicates that the slope signal is ineffective and cannot indicate the voltage variation at the common node of the first switch and the second switch, the fourth logic circuit is configured to provide the first reset signal based on comparing the current sense signal with the first current threshold, and the fifth logic circuit is configured to provide the second reset signal based on comparing the current sense signal with the second current threshold.

8. The control circuit of claim 6, wherein:
when the mode signal indicates that the resonant converter works at the capacitive mode, the fourth logic circuit is configured to provide the first reset signal further based on the time-out signal to control a maximum value of the first dead-time period, and the fifth logic circuit is configured to provide the second reset signal further based on the time-out signal to control a maximum value of the second dead-time period; and
when the mode signal indicates that the resonant converter works at the inductive mode, the fourth logic circuit is configured to provide the first reset signal further based on the maximum dead-time signal to control the maximum value of the first dead-time period, and the fifth logic circuit is configured to provide the second reset signal further based on the maximum dead-time signal to control the maximum value of the second dead-time period.

9. A resonant converter, comprising:
a high-side switch, having a first terminal, a second terminal and a control terminal, wherein the first terminal is configured to receive an input voltage;
a low-side switch, having a first terminal, a second terminal and a control terminal, wherein the first terminal is coupled to the second terminal of the high-side switch at a common node, and the second terminal is coupled to a system ground;
a resonant tank, coupled between the common node and the system ground;
a current sensing circuit, configured to provide a current sense signal based on a current flowing through the resonant tank;
a slope sensing circuit, configured to provide a slope signal based on a voltage variation at the common node;
a slope judge circuit, configured to provide a slope judge signal based on the slope signal, wherein the slope judge signal is configured to indicate if the slope signal is effective to indicate the voltage variation at the common node, and wherein if the slope signal is detected decreasing after turning OFF the high-side switch or if the slope signal is detected increasing after turning OFF the low-side switch, then the slope signal is judged effective;
an oscillator, configured to provide a clock signal, wherein the low-side switch is turned OFF when the clock signal is at a first status, and the high-side switch is turned OFF when the clock signal is at a second status;

a turn-ON control circuit, configured to provide a first reset signal and a second reset signal based on the slope signal, the slope judge signal, and the current sense signal; and a switching control circuit, configured to provide a first switching control signal to the control terminal of the high-side switch, and provide a second switching control signal to the control terminal of the low-side switch, wherein the first switching control signal is configured to turn ON the high-side switch based on the second reset signal, and is configured to turn OFF the high-side switch based on the clock signal, and wherein the second switching control signal is configured to turn ON the low-side switch based on the first reset signal, and is configured to turn OFF the low-side switch based on the clock signal.

10. The resonant converter of claim 9, wherein:

when the slope judge signal indicates that the slope signal is effective to indicate the voltage variation at the common mode, the turn-on control circuit is configured to provide the first reset signal based on the slope signal and a first slope threshold, and provide the second reset signal based on the slope and a second slope threshold; and when the slope judge signal indicates that the slope signal is ineffective and cannot indicate the voltage variation at the common node, the turn-on control circuit is configured to provide the first reset signal based on the current sense signal and a first current threshold, and provide the second reset signal based on the current sense signal and a second current threshold.

11. The resonant converter of claim 9, wherein the slope judge circuit further comprises:

a first comparator, having a first input terminal, a second input terminal and an output terminal, wherein the first input terminal is configured to receive the slope signal, and the second input terminal is configured to receive a third slope threshold;

a second comparator, having a first input terminal, a second input terminal and an output terminal, wherein the first input terminal is configured to receive the slope signal, and the second input terminal is configured to receive a fourth slope threshold; and a first logic circuit, having a first input terminal, a second input terminal, a third input terminal, and an output terminal, wherein the first input terminal is coupled to the output terminal of the first comparator, the second input terminal is coupled to the output terminal of the second comparator, and the third input terminal is configured to receive the clock signal, wherein when the clock signal is at the first status, the output terminal is configured to provide the slope judge signal based on comparing the slope signal with the third slope threshold, and wherein when the clock signal is at the second status, the output terminal is configured to provide the slope judge signal based on comparing the slope signal with the fourth slope threshold.

12. The resonant converter of claim 9, wherein:

after the high-side switch is turned OFF, if the slope signal is judged effective to indicate the voltage variation at the common node, the low-side switch is turned ON when the slope signal is larger than a first slope threshold; and after the low-side switch is turned OFF, if the slope signal is judged effective to indicate the voltage variation at the common node, the high-side switch is turned ON when the slope signal is less than a second slope threshold.

13. The resonant converter of claim 9, wherein the turn-on control circuit further comprises:

a third comparator, having a first input terminal, a second input terminal, and an output terminal, wherein the first input terminal is configured to receive the slope signal, and the second input terminal is configured to receive a first slope threshold;

a fourth comparator, having a first input terminal, a second input terminal and an output terminal, wherein the first input terminal is configured to receive the current sense signal, and the second input terminal is configured to receive a first current threshold;

a fifth comparator, having a first input terminal, a second input terminal and an output terminal, wherein the first input terminal is configured to receive the slope signal, and the second input terminal is configured to receive a second slope threshold;

a sixth comparator, having a first input terminal, a second input terminal, and an output terminal, wherein the first input terminal is configured to receive the current sense signal, and the second input terminal is configured to receive a second current threshold;

a second logic circuit, having a first input terminal, a second input terminal, a third input terminal, and an output terminal, wherein the first input terminal is coupled to the output terminal of the third comparator, the second input terminal is coupled to the output terminal of the fourth comparator, and the third input terminal is configured to receive the slope judge signal, wherein when the slope judge signal indicates that the slope signal is effective to indicate the voltage variation at the common node, the output terminal is configured to provide the first reset signal based on comparing the slope signal with the first slope threshold, and wherein when the slope judge signal indicates that the slope signal is ineffective and cannot indicate the voltage variation at the common node, the output terminal is configured to provide the first reset signal based on comparing the current sense signal with the first current threshold; and a third logic circuit, having a first input terminal, a second input terminal, a third input terminal, and an output terminal, wherein the first input terminal is coupled to the output terminal of the fifth comparator, the second input terminal is coupled to the output terminal of the sixth comparator, and the third input terminal is configured to receive the slope judge signal, wherein when the slope judge signal indicates that the slope signal is effective to indicate the voltage variation at the common node, the output terminal is configured to provide the second reset signal based on comparing the slope signal with the second slope threshold, and wherein when the slope judge signal indicates that the slope signal is ineffective and cannot indicate the voltage variation at the common node, the output terminal is configured to provide the second reset signal based on comparing the current sense signal with the second current threshold.

14. The resonant converter of claim 9, wherein the slope sensing circuit further comprises:

a first capacitor, having a first terminal coupled to the common node, and a second terminal configured to provide the slope signal;

a resistor, having a first terminal coupled to the second terminal of the first capacitor, and a second terminal coupled to the system ground;

a first current source, having an output terminal coupled to the second terminal of the first capacitor, wherein when the high-side switch is turned ON, the first current source starts to provide a first charge current at the output terminal until the low-side switch is turned ON; and a second current source, having an output terminal coupled to the second terminal of the first capacitor, wherein when the low-side switch is turned ON, the second current source starts to provide a first discharge current at the output terminal until the high-side switch is turned ON.

15. The resonant converter of claim 9, wherein the oscillator further comprises:

a switch, having a first terminal and a second terminal;

a third current source, coupled to the first terminal of the switch, wherein when the clock signal is at the first status, the third current source is configured to provide a second charge current to the first terminal of the switch;

a fourth current source, coupled to the first terminal of the switch, wherein when the clock signal is at the second status, the fourth current source is configured to provide a second discharge current to the first terminal of the switch;

a second capacitor, having a first terminal and a second terminal, wherein the first terminal is coupled to the second terminal of the switch, and the second terminal is coupled to the system ground;

a fourth logic circuit, configured to provide the clock signal based on a voltage across the second capacitor, wherein when the voltage across the second capacitor is less than a first comparing threshold, the clock signal transits to the first status, and wherein when the voltage across the second capacitor is larger than a second comparing threshold, the clock signal transits to the second status.

16. A control method for a resonant converter, the resonant converter comprising a switching circuit having a first switch, a second switch, and a resonant tank coupled to a common node of the first switch and the second switch, wherein the first switch and the second switch are coupled in series between an input voltage and a system ground, the control method comprising:

providing a slope signal based on a voltage variation at the common node of the first switch and the second switch;

providing a current sense signal based on a current flowing through the resonant tank;

turning OFF the second switch when a clock signal is at a first status, and turning OFF the first switch when the clock signal is at a second status; and judging if the slope signal is effective to indicate the voltage variation at the common node of the first switch and the second switch; and wherein when the slope signal is judged effective, adjusting a first dead-time period and turning ON the second switch based on the slope signal and a first slope threshold, and adjusting a second dead-time period and turning ON the first switch based on the slope signal and a second slope threshold, wherein the first dead-time period is a time period from turning OFF the first switch to turning ON the second switch, and the second dead-time period is a time period from turning OFF the second switch to turning ON the first switch.

17. The control method of claim 16, wherein providing the slope signal further comprises:

coupling a first terminal of a capacitor to the common node of the first switch and the second switch, wherein a second terminal of the capacitor is configured to provide the slope signal;

coupling a first terminal of a resistor to the second terminal of the capacitor, and coupling a second terminal of a resistor to the system ground; and coupling a voltage control circuit to the resistor in parallel, wherein the voltage control circuit is configured to maintain the slope signal at high voltage level when the first switch is turned ON, and the voltage control circuit is configured to maintain the slope signal at low voltage level when the second switch is turned ON.

18. The control method of claim 16, wherein judging if the slope signal is effective to indicate the voltage variation at the common node of the first switch and the second switch further comprising:

after the second switch is turned OFF, judging if the slope signal is effective by comparing the slope signal with a third slope threshold; and after the first switch is turned OFF, judging if the slope signal is effective by comparing the slope signal with a fourth slope threshold.

19. The control method of claim 16, further comprising:

if the slope signal cannot indicate the voltage variation at the common node of the first switch and the second switch, adjusting the second dead-time period and turning ON the first switch based on the current sense signal and a first current threshold, and adjusting the first dead-time period and turning ON the second switch based on the current sense signal and a second current threshold.

20. The control method of claim 16, further comprising:

judging a work mode of the resonant converter based on a polarity of the current flowing through the resonant tank; and wherein if the resonant converter is judged working at a capacitive mode, a maximum value of the first dead-time period and a maximum value of the second dead-time period are determined by a time-out signal; and if the resonant converter is judged working at an inductive mode, the maximum value of the first dead-time period and the maximum value of the second dead-time period are determined by a maximum dead-time signal.

* * * * *